Jan. 5, 1954   F. K. H. NALLINGER   2,664,849
INDICATING INSTRUMENT WITH DIAL PLATE, ADAPTED
TO BE ILLUMINATED
Filed Aug. 4, 1950
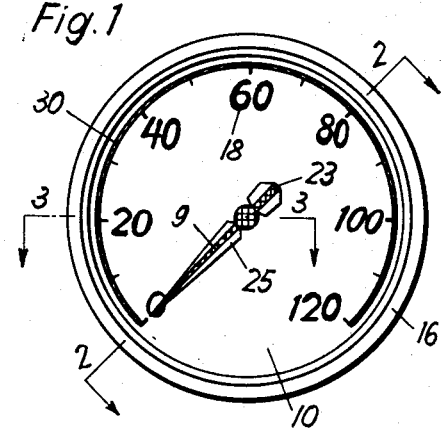
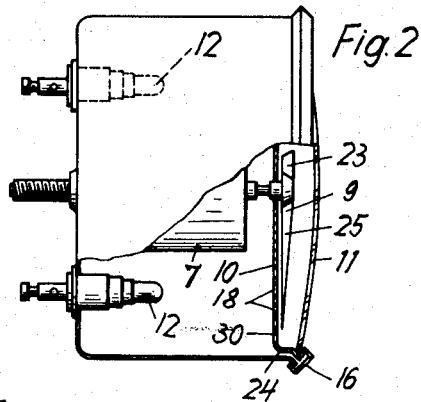
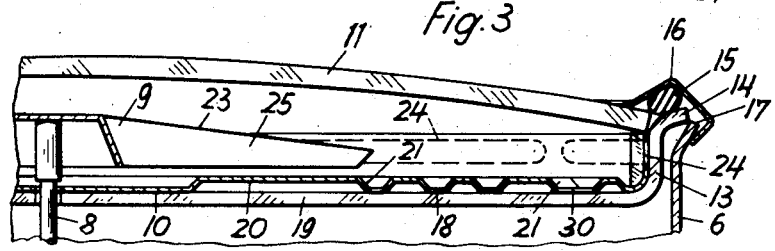
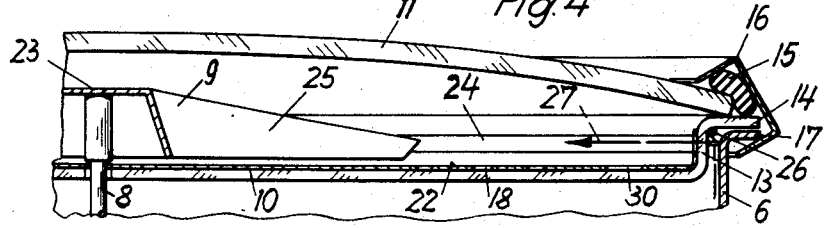
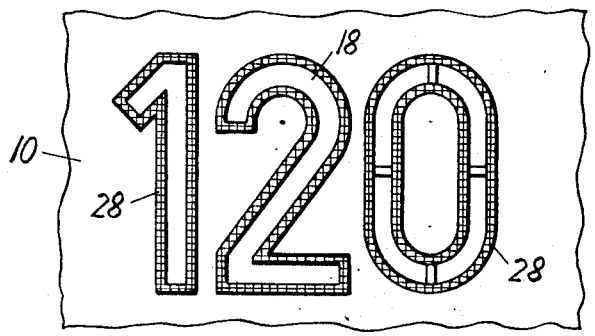

Patented Jan. 5, 1954

2,664,849

UNITED STATES PATENT OFFICE 2,664,849

INDICATING INSTRUMENT WITH DIAL PLATE, ADAPTED TO BE ILLUMINATED

Friedrich K. H. Nallinger, Stuttgart, Germany, assignor to Daimler-Benz Aktiengesellschaft, Stuttgart Unterturkheim, Germany Application August 4, 1950, Serial No. 177,578

Claims priority, application Germany August 5, 1949

11 Claims. (Cl. 116—129)

This invention relates to an indicating instrument with a dial plate adapted to be illuminated, in particular for vehicles of any kind, e. g. locomotives, especially for motor vehicles. As to the legibility of the indications by day and by night quite a number of conditions concerning such instruments must be complied with which in part are contradictory and hence only very difficult to be met. Thus the figures on the dial plate and the position of the pointer should be clearly legible by night also at some distance, but on the other hand the dial plate must not be too bright as otherwise it will dazzle the driver. The best solution of the problem would be to have in daytime a light dial plate with dark figures and a dark pointer, and by night a dark dial plate with light figures and a light pointer. It is an object of the invention to meet these requirements with comparatively simple means to a far extent.

The invention consists in that the dial plate made of an opaque or only slightly transparent material is provided with transparent indicating means (e. g. figures or letters) and/or scale which may, for instance, be punched out of the dial plate or made of transparent material, provision being made further to illuminate the dial plate by night from behind. This will have as a result that the figures and the graduation of the scale recessed in the dial plate appear dark by daylight against the light-coloured dial plate, since the interior of the indicator casing forming the background is in the dark, whilst by night the interior of the casing is illuminated by a source of light, thus making the figures and the scale appear light on the dial plate which is not illuminated now and therefore appears dark. The same effect will be obtained with a dial plate made of an originally clear transparent material, such as glass or artificial materials, but sprayed afterwards by means of a pattern with a light but opaque or at most slightly transparent paint in such a manner that the places where the figures and the scale are designed to appear are not covered by the paint and therefore remain clear and transparent. In order to make the figures and the scale appear still more contrasting their outlines may be provided in both cases with a narrow dark rim and in the case of a dial plate made of sheet metal, the rims of the figures and of the scale may also be given a contrasting appearance by embossing.

A similar effect of contrast is obtained for the movable pointer of the indicator by giving the light-coloured pointer an angular- (e. g. roof-) shaped cross section, providing it on its vertex line or vertex area with a black strip and illuminating the inclined lateral faces of the pointer by night laterally. The latter may be realized by providing in the upstanding rim of the deep lying dial plate, i. e. in front of the dial plate a plurality of openings, e. g. windows or slots through which light from a source of light behind the dail plate falls on the lateral faces of the pointer.

The invention is clearly illustrated by means of some forms of embodiment in the accompanying drawings, in which Fig. 1 is a front view of the indicator according to the invention, Fig. 2 is a lateral view of the indicator partly in longitudinal section along the line 2—2 of Fig. 1, Figs. 3 and 4 are corresponding sections through one half of the indicator on an enlarged scale showing different forms of the dial plate and Fig. 5 is a plan view of one figure of the dial plate also on an enlarged scale.

The indicator which in the examples of construction illustrated is a speedometer for motor vehicles substantially comprises a casing 6, a counter 7 of known type and therefore not specifically described herein, a pointer 9 secured to the shaft 8, a dial plate 10, a cover-glass 11 and electric lamps 12. In all of the three forms of embodiment illustrated the dial plate 10 is provided with an upstanding rim 13 and secured at the angularly bent flange 14 of the rim 13 together with the cover glass 11 and an interposed rubber ring 15 by means of sheet metal ring 16 to the outer rim 17 of the casing 6.

In Figs. 1 and 2 the dial plate 10 consists of a comparatively thicker sheet metal from which the figures 18 and the scale 30 are punched out. The dial plate of the form of embodiment shown in Fig. 3 consists of a supporting lower part 19 of clear transparent artificial material and a plate 20 of thin-walled sheet metal. The figures 18 and the scale 30 are again punched out of the plate 20 and provided at their outlines with inclined embossed rims 21. The outlines of the figures and of the scale are in addition accentuated by a dark paint 28 (Fig. 5), whilst the remaining surface of the dial plate has a light-coloured, for instance white or ivory coloured paint. In the form of embodiment shown in Fig. 4 the dial plate 10 consists only of a clear transparent artificial material and is provided with a cover 22 of light-coloured paint in which latter the figures 18 and the scale graduation 30 are recessed by covering the spots where the figures and the scale are intended to appear with a pattern when spraying the paint.

The pointer 9 of the speedometer has according to all the three forms of embodiment an angular or roof-shaped cross section. It is likewise light-coloured and only on its vertex line or vertex area 23 provided with a dark contrasting line. In the upstanding rim 13 of all dial plates a plurality of slots or windows 24 are arranged through which the lateral faces 25 of the pointers receive the light from the electric lamps 12 reflected by the internal faces of the casing 6 if said lamps are switched on by night. In the example of construction shown in Fig. 4 there is still a polished metal ring 26 serving as a reflector placed around the dial plate 10 in the height of the windows 24 in order to reflect the light rays coming from the casing with greater intensity in the direction of the arrow 27 upon the lateral faces of the pointer.

As it will be obvious without any difficulty, the construction of the dial plate and of the lighting means according to the invention gives the following result: As the daylight is prevented to a far extent from entering the interior of the casing 6, the recessed or punched out figures 18 as well as the scale 30 appear in day-time dark on the light-coloured background of the dial plate. This effect is still accentuated by the dark rims of the figures and of the scale. The legibility of the instrument will be considerably improved in this case by the black strip 23 on the back of the pointer. If by night, however, the electric lamps 12 are switched on, the interior of the casing behind the dial plate 10 is illuminated so that the figures and the scale appear light on the dial plate which now appears dark. Reading on the dial plate is now easily possible also at some distance with the help of the laterally illuminated inclined faces 25 of the pointer converging towards the end of the latter especially without any dazzling effect by large bright areas.

Though this invention has been described hereinbefore as applied to a speedometer for motor vehicles, it may find application with the same advantages as well to any other indicating or measuring instrument for any other purpose.

Having now particularly described the nature of my invention, what I claim is:

1. An indicating instrument comprising a casing, an at most somewhat translucent dial plate closing one side of the casing and having transparent indices thereon, an indicator movable over the dial plate, first means inside the casing behind the dial plate for illuminating the dial plate and the indices from behind, and additional means for illuminating the indicator from the side in conjunction with said first means.

2. An indicating instrument according to claim 1, wherein the dial plate is made of a material capable of being punched, the indicating means being punched out of the dial plate.

3. An indicating instrument according to claim 1, the dial plate being made of an originally transparent material and coated with an opaque layer from which latter the indicating means have been recessed.

4. An indicating instrument according to claim 1, the outlines of the indices being provided with a dark colored edging.

5. An indicating instrument according to claim 4, the outlines of the indicating means being contrasted by embossed rims.

6. An indicating instrument according to claim 1, wherein the indicator has a roof-shaped cross-section and is of a light color, the vertex of the roof-shape being provided with a dark colored strip.

7. An indicating instrument according to claim 1, wherein the dial plate is positioned inside the casing and is provided with a forwardly flanged edge, the means for illuminating the indicator comprising a plurality of openings in the flanged edge positioned to shed light, emanating from the means for illuminating the inside of the casing, laterally onto the indicator, and wherein the indicator is light colored and of roof-shaped cross-section.

8. An indicating instrument according to claim 7, in front of the dial plate a reflecting ring being provided with a mirror-like surface by means of which the light rays from the source of light within the casing are reflected partly upon the lateral faces of the pointer.

9. An indicating instrument for motor vehicles according to claim 1, wherein the indicator is light colored and of roof-shaped cross section and provided on its vertex area with a dark-colored strip.

10. An indicating instrument for motor vehicles comprising a casing, an at most somewhat translucent dial plate positioned inside the casing to close one side thereof and having a forwardly flanged edge peripherally engaging the casing, the dial plate having transparent indices thereon, an indicator movable over the dial plate, first means inside the casing and behind the dial plate for illuminating the dial plate and the indices from behind and additional means for illuminating the indicator from the side in conjunction with said first means comprising a plurality of openings in the flanged edge positioned to shed light emanating from said first means laterally on to the indicator, the indicator being light colored and of roof-shaped cross-section.

11. An indicating instrument for motor vehicles according to claim 10, in front of the dial plate a reflecting ring being provided with a mirror-like surface by means of which the light rays from the source of light within the casing are reflected partly upon the lateral faces of the pointer.

FRIEDRICH K. H. NALLINGER.

References Cited in the file of this patent

UNITED STATES PATENTS

| Number | Name | Date |
| --- | --- | --- |
| 1,525,107 | Spencer | Feb. 3, 1925 |
| 1,917,079 | Adams | July 4, 1933 |
| 1,994,950 | Hoffritz | Mar. 19, 1935 |
| 2,089,131 | Moreton | Aug. 3, 1937 |
| 2,112,880 | Brewer | Apr. 5, 1938 |
| 2,278,520 | Klein | Apr. 7, 1942 |